Patented Aug. 16, 1949

2,479,205

UNITED STATES PATENT OFFICE 2,479,205

MANUFACTURE OF NITROGEN-CONTAINING COMPOUNDS

Gerard Dunstan Buckley and Neil Hunter Ray, Northwich, England, assignors to Imperial Chemical Industries Limited, a corporation of Great Britain No Drawing. Application June 25, 1947, Serial No. 757,060. In Great Britain July 31, 1946

3 Claims. (Cl. 260—570)

This invention relates to the manufacture of condensation products from carbon monoxide and aromatic amines.

We have found that at sufficiently high pressures in the region of a few thousand atmospheres and at elevated temperatures, carbon monoxide and primary aromatic amines can be caused to react giving condensation products in which aromatic amine radicals are linked through nuclear carbon atoms by such groups as —CHOH— and —CH$_2$—.

According to the present invention we manufacture condensation products of amines and carbon monoxide by a process which comprises subjecting a primary aromatic amine having at least two of the positions ortho and para to the amino groups free from substituents, and carbon monoxide, to a temperature above 150° C. and preferably between 200° and 300° C., and a pressure exceeding 1000 atmospheres and preferably between 2000 and 4000 atmospheres, in the presence of a mineral acid catalyst.

The aromatic amines used in this invention include aniline, o-toluidine, p-toluidine, m-phenylene-diamine, p-phenylene diamine, benzidine, p-chloroaniline, p-bromoaniline, anthranilic ester (ethyl anthranilate), p,p' - diaminodiphenylmethane. If desired, part or all of the amine may be replaced by its N-formyl derivative. Mixed products may also be obtained by using two or more amines in the reaction mixture.

The mineral acid catalysts used in this invention include principally nitric, phosphoric, hydrochloric, hydrofluoric and sulphuric acids, and salts of such acids with the primary aromatic amine which is used in the reaction. An example of such a salt is aniline hydrochloride. The amount of catalyst used is between 0.1 and 10% by weight of the amine and is generally between 0.2 and 1%, preferably 0.5%.

In one manner of carrying out this invention the primary aromatic amine is put into a pressure vessel along with a suitable amount of mineral acid catalyst. It is desirable to use a pressure vessel which is made of or lined with a corrosion-resistant material, in order to avoid contamination of the products. The pressure vessel is then closed and carbon monoxide is injected under pressure, and the vessel is heated to the desired temperature. The reaction then commences and the pressure falls due to the reaction, or may be maintained if preferred by injection of more carbon monoxide. It is desirable to agitate the reaction mixture in order that the reaction shall proceed at a satisfactory rate and in order to produce more homogeneous products. The reaction may be allowed to proceed until no further drop in pressure occurs, or it may be interrupted at an earlier stage if desired. The vessel is allowed to cool, the pressure is released and the vessel is opened. The reaction mixture thus obtained may be a viscous liquid or a solid, depending on the conditions chosen, and may be a pure condensation product but is generally a mixture of condensation products containing different numbers of amine radicals joined by —CH$_2$— or —CHOH— groups. If desired, pure products can be separated from this mixture by fractional distillation or by fractional dissolution except in the case of insoluble and infusible products.

The reaction may also be carried out as a continuous process in which the reactants are fed or injected continuously into a reaction vessel or series of vessels maintained at a suitable temperature and pressure and the products are removed therefrom. In certain cases it is convenient to carry out the reaction in presence of a liquid medium such as water or benzene, but generally this is undesirable because it is then necessary to separate the products from the liquid medium.

The time required for the reaction depends on the amine used, the conditions and method of operation, and the type of product desired, but is generally between 1 and 24 hours. At temperatures of between 150° and 200° C. the reaction is slow and therefore the time required is generally between 15 and 24 hours. Above 300° C. the reaction is much more rapid but care must be taken to avoid decomposition of the reactants and the products. For these reasons, we prefer to use temperatures between 200° and 300° C.

Although we do not wish to be limited by this explanation, we believe that the reaction proceeds by way of the carbon monoxide linking with the —NH$_2$ group of the primary aromatic amine to give an N-formyl derivative, and we believe that this derivative then reacts with one or more further molecules of amine and undergoes molecular rearrangement so as to produce a molecule in which two or more radicals are linked by a —CHOH— group through the carbon atoms in the ortho or para position to the amine group. Thus the amine requires two such positions free from substituents in order to build up a molecular chain containing three or more aromatic amine residues. Increase in the temperatures at which the reaction is carried out as sists this reaction. We have shown that by raising the reaction temperature the products obtained are of increased molecular weight. Thus an —NH₂ group of the diamine produced by linkage of two primary aromatic amine molecules reacts with further carbon monoxide in the same manner to give an N-formyl derivative, and then reacts with a further amine molecule and undergoes molecular rearrangement. In this way a polymeric amine is built up containing two or more units of the original amine per molecule and generally containing between 3 and 6 molecules of the original amine per molecule. The size of the polymeric amine molecule depends inter alia on the original amine and on the reaction temperature. The reaction only occurs at a high pressure, and the effect of increasing pressure assists this reaction and also assists in a further reaction in which the —CHOH— linkage is reduced to a —CH₂— linkage. Thus we can vary both the size of the polymeric amine molecule and also the proportion of —CHOH— and —CH₂— linkages in these molecules. To some extent long reaction times have the same effect as increased temperature and pressure, i. e. diamines and triamines can be produced with short reaction times of the order of 1 hour, and higher amines such as hexamines and decamines can be produced with reaction times of the order of 24 hours.

In this way, the temperature, pressure and time of reaction are all independent variables which may be chosen according to the product desired. At the lower temperatures and pressures within the preferred ranges the products are viscous liquids containing free amino groups. At the higher temperatures and pressures in the preferred ranges, the product is a hard solid of high melting point containing a large number of molecules of the original amine per molecule and in which the primary amino groups have been mostly converted to formyl amino groups. This solid is insoluble in dilute aqueous acids and decomposes on heating before its melting point is reached. Thus we may obtain products ranging from viscous liquids through soluble and fusible solids to insoluble and infusible solids depending upon the complexity of the original amine and on the reaction conditions chosen. The product obtained is generally a mixture which can be separated into fractions by successively extracting the soluble portion with mineral acid solutions of appropriate concentration. The lower molecular weight fractions are dissolved by the more concentrated acid, and vice versa. The final residue, which is not dissolved by the most dilute acid, is the high molecular weight, insoluble formylamino-containing product mentioned above, although this fraction is only produced in a high proportion when the reaction is prolonged and only at the upper limits of temperature and pressure. The acid-soluble fractions may be recovered from their acid solutions by neutralisation with alkali, or they may be obtained as their salts with the acid by concentration of the solution.

The invention is illustrated but not restricted by the following examples in which all parts are by weight. The first example illustrates the formation of a soluble basic resin from aniline, and the second illustrates the formation of an insoluble basic resin from benzidine. Subsequent examples illustrate the use of different classes of amines, and the use of different reaction conditions.

Example 1

200 parts of aniline and 1 part of concentrated hydrochloric acid of specific gravity 1.16 are put in a stirred stainless steel vessel of capacity approximately double the total liquid volume. The air remaining in the vessel is replaced by carbon monoxide under pressure, and the vessel is heated to 250° C. Additional carbon monoxide is then added until the total pressure is 3000 atmospheres. The reaction proceeds, and more carbon monoxide is added to maintain the pressure at 3000 atmospheres. After 15 hours the vessel is cooled and the pressure is released. The product obtained is 250 parts of a brown solid, 90% of which is soluble in N/10 hydrochloric acid, and has a molecular weight of 400.

Example 2

200 parts of benzidine and 1 part of concentrated hydrochloric acid of specific gravity 1.16 are put in a stirred stainless steel vessel with carbon monoxide as in Example 1. The temperature and pressure are raised to 250° C. and 3000 atmospheres respectively, and during 24 hours the temperature is kept at 250° C. and the pressure falls gradually to 2500 atmospheres. The product is 220 parts of a hard, infusible, insoluble resin which can be used as an anion exchange resin.

Example 3

40 parts of m-phenylene diamine and 0.1 part of concentrated hydrochloric acid of specific gravity 1.16 are put in a stirred steel vessel with carbon monoxide as in Example 1. The temperature is raised to and maintained at 200° C., while the pressure which is raised initially to 3000 atmospheres falls during 20 hours to 2500 atmospheres. The product is 41 parts of a brown solid which is soluble in dilute acids, melts at 60°–120° C., and has a molecular weight of 600.

Example 4

40 parts of ethyl anthranilate and 0.1 part of concentrated hydrochloric acid of specific gravity 1.16 are put in a vessel with carbon monoxide as described in Example 1. The temperature is raised to and kept at 250° C., and the initial pressure is 3000 atmospheres. After 20 hours the pressure has fallen to 2100 atmospheres and on cooling the vessel and releasing the pressure the product obtained is 40 parts of a solid which is soluble in dilute acids. This product contains ester groups which are hydrolysable to give an amphoteric compound soluble in water, acids and alkalies.

Example 5

40 parts of p-bromoaniline and 0.1 part of concentrated hydrochloric acid of specific gravity 1.16 are reacted with carbon monoxide as described in Example 1, the temperature and pressure being kept throughout at 250° C. and 2500 atmospheres respectively. After 24 hours the product obtained is 42 parts of a light brown solid which is soluble in dilute hydrochloric acid.

Example 6

20 parts of formanilide, 30 parts of aniline and 2 parts of aniline hydrochloride are treated with carbon monoxide as described in Example 1. The temperature is raised to and maintained at 250° C. and the pressure is raised to 2000 atmospheres and is maintained constant by periodic additions of more carbon monoxide. After 20 hours there is obtained 50 parts of a viscous liquid containing 10 parts of unchanged aniline which are separated by distillation, leaving a very viscous liquid. From this liquid two products can be obtained by continued distillation; one is 10 parts of a low molecular weight fraction boiling from 160°–230° C., and the other is 30 parts of a pitch-like residue which is soluble in dilute acids.

The products which are soluble in dilute acids may be used as intermediates in the manufacture of dyestuffs and synthetic resins. The products which are insoluble, in particular those derived from aromatic diamines such as benzidine, may be used as anion exchange resins. Some of the products obtained by this reaction are themselves novel products. In particular, those containing three or more molecules of aromatic amine per molecule of product and linked through

groups are new products which have not hitherto been obtained and may be represented by the general formula

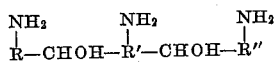

where R, R' and R'' are the same or different aromatic groupings. For example, the higher amines containing 4 or more amine molecules per molecule of condensation product are products which have this general formula in which R and R' are the aromatic residue of the original aromatic amine, and R''NH$_2$ is a diamine or polyamine produced by condensation of two or more of the original amine molecules with carbon monoxide. If desired, part or all of the —CHOH— groups may be replaced by —CH$_2$— groups as stated hereinbefore.

What we claim is:

1. A process for obtaining condensation products which comprises heating carbon monoxide and an amino compound in contact with a catalyst under a pressure above 1000 atmospheres at a temperature of from 150° C. to 300° C., said amino compound being selected from the group consisting of primary aromatic amines having at least two of the positions ortho and para to the amino group unsubstituted and N-formyl derivatives of said amines, said catalyst being selected from the group consisting of mineral acids and salts of said acids with said amines.

2. A process for obtaining condensation products which comprises heating carbon monoxide and an amino compound in contact with a catalyst under a pressure of 2000 to 4000 atmospheres at a temperature of from 200° C. to 300° C., said amino compound being selected from the group consisting of primary aromatic amines having at least two of the positions ortho and para to the amino group unsubstituted and N-formyl derivatives of said amines, said catalyst being selected from the group consisting of mineral acids and salts of said acids with said amines.

3. A polyamine condensation product of carbon monoxide and an aromatic compound in contact with a catalyst under a pressure above 1000 atmospheres at a temperature of from 150° C. to 300° C., said amino compound being selected from the group consisting of primary aromatic amines having at least two of the positions ortho and para to the amino group unsubstituted and N-formyl derivatives of said amines, said catalyst being selected from the group consisting of mineral acids and salts of said acids with said amines.

GERARD DUNSTAN BUCKLEY.
NEIL HUNTER RAY.

REFERENCES CITED

The following references are of record in the file of this patent:

Liston et al., "Ind. Eng. Chem.," 26, 1073–1074 (1934).